United States Patent [19]

Fife et al.

[11] Patent Number: 5,721,758
[45] Date of Patent: Feb. 24, 1998

[54] BOTTOM HEAD TO SHELL JUNCTION ASSEMBLY FOR A BOILING WATER NUCLEAR REACTOR

[75] Inventors: Alex Blair Fife; Gary J. Ballas, both of San Jose, Calif.

[73] Assignee: General Electric Company, Schenectady, N.Y.

[21] Appl. No.: 608,635

[22] Filed: Feb. 29, 1996

[51] Int. Cl.[6] .................................................. G21C 13/00
[52] U.S. Cl. ................................................................ 376/294
[58] Field of Search ............................. 376/294; 220/581

[56] References Cited

U.S. PATENT DOCUMENTS

| | | | |
|---|---|---|---|
| 4,057,163 | 11/1977 | Widart et al. | 376/294 |
| 4,892,702 | 1/1990 | Vignes | 376/294 |
| 5,519,744 | 5/1996 | Relf | 376/287 |
| 5,586,154 | 12/1996 | Kumar et al. | 376/203 |

*Primary Examiner*—Daniel D. Wasil
*Attorney, Agent, or Firm*—Armstrong, Teasdale, Schlafly & Davis

[57] ABSTRACT

A bottom head to shell junction assembly which, in one embodiment, includes an annular forging having an integrally formed pump deck and shroud support is described. In the one embodiment, the annular forging also includes a top, cylindrical shaped end configured to be welded to one end of the pressure vessel cylindrical shell and a bottom, conical shaped end configured to be welded to the disk shaped bottom head. Reactor internal pump nozzles also are integrally formed in the annular forging. The nozzles do not include any internal or external projections. Stubs are formed in each nozzle opening to facilitate welding a pump housing to the forging. Also, an upper portion of each nozzle opening is configured to receive a portion of a diffuser coupled to a pump shaft which extends through the nozzle opening. Diffuser openings are formed in the integral pump deck to provide additional support for the pump impellers. The diffuser opening is sized so that a pump impeller can extend at least partially therethrough. The pump impeller is connected to the pump shaft which extends through the nozzle opening.

18 Claims, 4 Drawing Sheets

BOTTOM HEAD TO SHELL JUNCTION ASSEMBLY FOR A BOILING WATER NUCLEAR REACTOR

GOVERNMENT RIGHTS STATEMENT

The Government of the United States of America and the Advanced Reactor Corporation have rights in this invention pursuant to Contract No. DE-FC02-92NE342657 awarded by the U.S. Department of Energy.

FIELD OF THE INVENTION

This invention relates generally to boiling water nuclear reactors and more particularly, to a bottom head knuckle assembly which forms a junction between a dished bottom head and a cylindrical shell of a reactor pressure vessel.

BACKGROUND OF THE INVENTION

Boiling water nuclear reactors typically include a reactor core located within a reactor pressure vessel (RPV). A known RPV includes a substantially cylindrical shell. The shell, for example, can be about twenty feet in diameter and about seven inches thick. A substantially cylindrical core shroud is positioned within, and spaced from, the shell walls to restrain horizontal movement of the reactor core fuel bundles.

A bottom head knuckle, or junction, assembly forms an interface, or junction, between the cylindrical shell and a substantially disk shaped bottom head. Specifically, the bottom head knuckle assembly includes a shroud support subassembly and an annular forging having a top, cylindrical shaped end and a bottom, conical shaped end. The top, cylindrical shaped end of the forging is configured to be welded to one end of the RPV shell and the bottom, conical shaped end of the forging is configured to be welded to the disk shaped bottom head.

The shroud subassembly includes a shroud support cylinder having an upper surface configured to be welded to the core shroud. An annular pump deck extends from an outer surface of the shroud support cylinder. Shroud support legs extend from the lower surface of the shroud support cylinder. The shroud support legs are welded to weld build-up pads formed on an inner surface of the annular forging.

In boiling water nuclear reactors that include recirculation pumps, which are sometimes referred to as reactor internal pumps (RIPs), RIP shaft penetrations, or accesses, are formed in the annular forging of the knuckle assembly. These penetrations generally are referred to as .RIP nozzles. Each RIP nozzle includes an internal projection and an external projection for engaging to, and supporting, the pump. At each nozzle location, a RIP casing is secured to the outer surface of the forging and a pump shaft extends through the nozzle. A pump diffuser, or impeller, is secured to the pump shaft and extends at least partially through a diffuser opening formed in the annular pump deck. The pump deck therefore forms a boundary between the low pressure and high pressure sides of the RIP impeller.

To manufacture the above described bottom head knuckle assembly, the annular forging and the shroud support subassembly are separately formed. Specifically, the annular forging including the nozzles and weld build-up pads are forged from a high quality carbon steel material with alloying elements, commonly referred to as low alloy steel (LAS). The support legs, pump deck and shroud support cylinder of the shroud support subassembly are separately formed from Ni—Cr—Fe plates. Specifically, the shroud support legs are welded to the lower surface of the shroud support cylinder and the pump deck is welded to the outer surface of the shroud support cylinder.

The shroud support subassembly is then located in the annular forging so that each of the shroud support legs rests on one of the respective forging weld build-up pads. The legs are then welded to the pads. To weld LAS, it is necessary to preheat the LAS to several hundred degrees, make the weld, then maintain the LAS at several hundred degrees post heat until the welded assembly can be post weld heat treated (PWHT) at 1100 degrees for several hours in a furnace or with portable heaters. After the PWHT, a weld deposited cladding of either stainless steel or Ni—Cr—Fe is applied to all LAS surfaces that will be wetted when the reactor is in service.

The above described manufacture process requires complex machining and cladding of the annular forging. For example, machining the RIP nozzles which have both internal and external projections is a very complex operation. Such complex manufacturing increases the time and costs associated with completing the assembly.

Further, during scheduled reactor servicing, each of these welds in the bottom head knuckle assembly typically must be inspected to ensure that the weld integrity is being maintained. While the above described assembly has a reduced number of welds compared to other known assemblies constructed of flat and curved plates and forgings welded together, the above described assembly still has numerous welds that require inspection. Of course, inspecting numerous welds is expensive and time consuming. In addition, the shroud support legs restrict the RIP flow into the reactor bottom head region. Reactor flow would be improved by eliminating such flow restrictions.

It would be desirable to provide a bottom head knuckle assembly with a reduced number of welds that require inspection during service, has reduced flow restrictions, and eliminates the use of Ni—Cr—Fe material. It also would be desirable to provide a bottom head knuckle assembly that is less expensive and less complex to manufacture.

SUMMARY OF THE INVENTION

These and other objects may be attained in a bottom head knuckle assembly which includes, in one embodiment, an annular forging having an integrally formed pump deck and shroud support. The annular forging also includes a top, cylindrical shaped end configured to be welded to one end of the RPV cylindrical shell and a bottom, conical shaped end configured to be welded to the disk shaped bottom head. RIP nozzles are integrally formed in the annular forging. The nozzles do not include any external projections. Stubs are formed in each nozzle opening to facilitate welding a pump housing to the forging. Also, an upper portion of each RIP nozzle opening is configured to receive a portion of a diffuser coupled to a pump shaft which extends through the nozzle opening.

Diffuser openings are formed in the integral pump deck to provide additional support for the pump impellers. The diffuser opening is sized so that a pump impeller can extend at least partially therethrough. The pump impeller is connected to a pump shaft which extends through the nozzle opening.

The above described bottom head knuckle assembly has a reduced number of welds as compared to known bottom head knuckle assemblies. Particularly, by forming the pump deck and shroud support integral with the forging, welds for such components are eliminated. As a result, the mount of time required to inspect the bottom head knuckle assembly welds should be reduced as compared to the mount of time required to inspect welds associated with the known assemblies. Further, since the pump deck and shroud support are integral with the annular forging in the above described embodiment, the pump deck and support are constructed of the same material as the annular forging, e.g., low alloy carbon steel. Such construction therefore eliminates the use of Ni—Cr—Fe material for the pump deck and shroud support.

In addition, the shroud support legs used in known assemblies are eliminated in the above described bottom head knuckle assembly. Flow restrictions therefore are reduced in such assembly as compared to known assemblies. By reducing the flow restrictions, flow of water into the bottom head region of the reactor should be improved. Moreover, since the internal and external nozzle projections are eliminated, machining of the nozzles is greatly simplified as compared to machining known nozzles

DETAILED DESCRIPTION OF THE DRAWINGS

Figure 1:
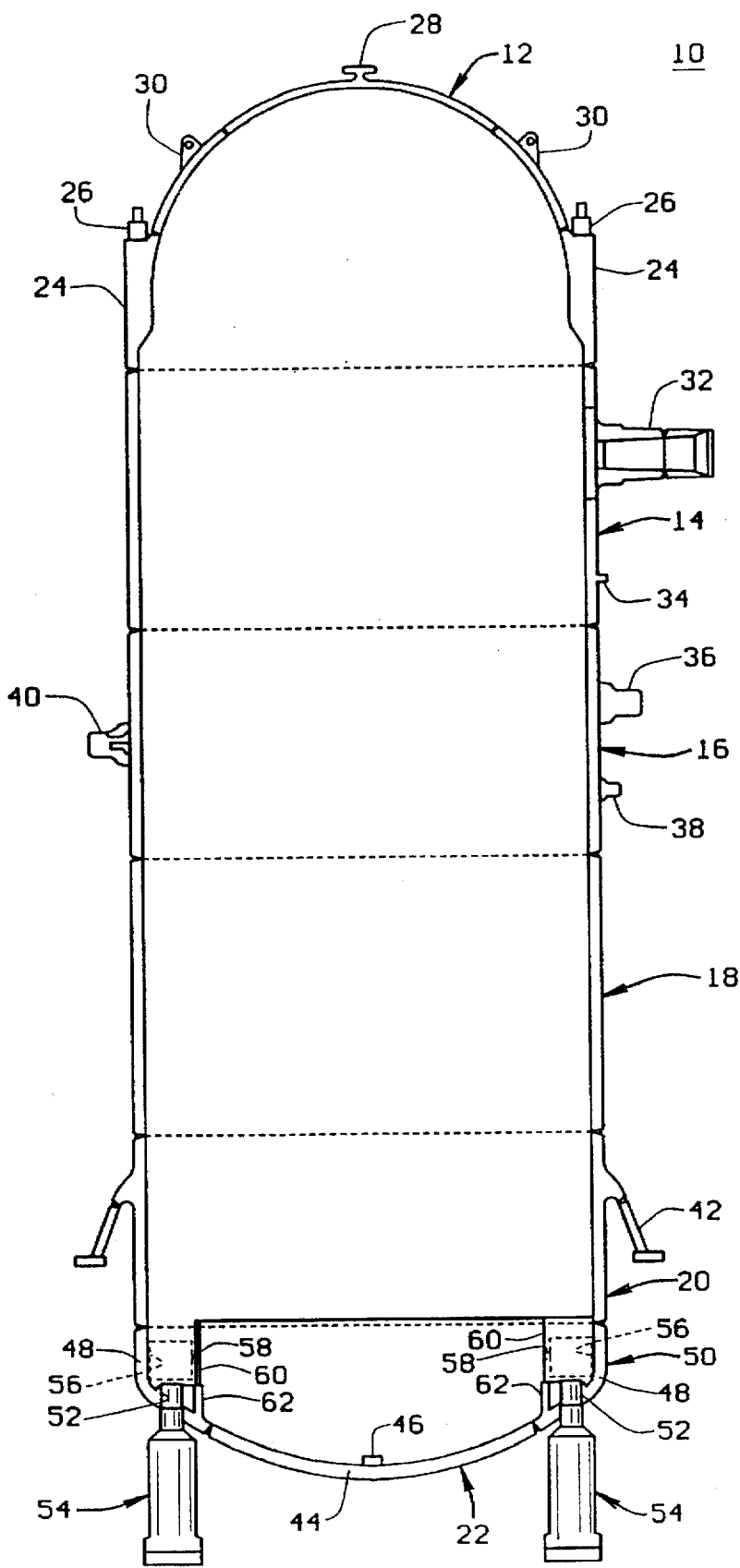
FIG. 1 is a schematic illustration of a reactor pressure vessel.

FIG. 1 is a schematic illustration of a reactor pressure vessel (RPV) 10. RPV 10 includes a top head 12, four substantially cylindrical shell courses 14, 16, 18 and 20, and a bottom head assembly 22. Top head 12 includes a head flange 24. Top head 12 is bolted to first shell course 14 by bolts 26 which extend through head flange 24. Top head 12 also includes a head spray and vent nozzle 28 and lifting flanges 30 used when lifting top head 12 from first shell course 14.

First shell course 14 includes main steam nozzles 32 through which steam flows out of the RPV 10. Stabilizer brackets 34 also are formed on first shell course 14. Second shell course 16 has a number of nozzles 36, 38 and 40 formed therein. Nozzles 36, 38 and 40 include both inlet and outlet nozzles. Fourth shell course 20 includes a support skirt 42 welded thereto. Support skirt 42 is utilized to support RPV 10 within the reactor housing (not shown).

Bottom head assembly 22 includes a bottom head dome 44 having a plurality of control rod drive housing penetrations with stub tubes 46 formed therein. Bottom head dome 44 is welded to an annular forging 48 of a bottom head knuckle assembly 50. Bottom head knuckle assembly 50 includes a plurality, e.g., ten, nozzles 52. Pumps 54 are secured to knuckle assembly 50 at nozzles 52 and pump impellers 56 extend through a pump deck 58 of assembly 50. Pump deck 58 extends from a cylindrical shroud support 60 having legs 62 supported on and welded to annular forging 48.

FIG. 1 is provided primarily for illustrative purposes to show a typical RPV 10 including knuckle assembly 50 which forms part of bottom head assembly 22. As clearly shown in FIG. 1, as impellets 56 rotate, water flow within bottom head assembly 22 is restricted to some extent by shroud support legs 62.

Figure 2:
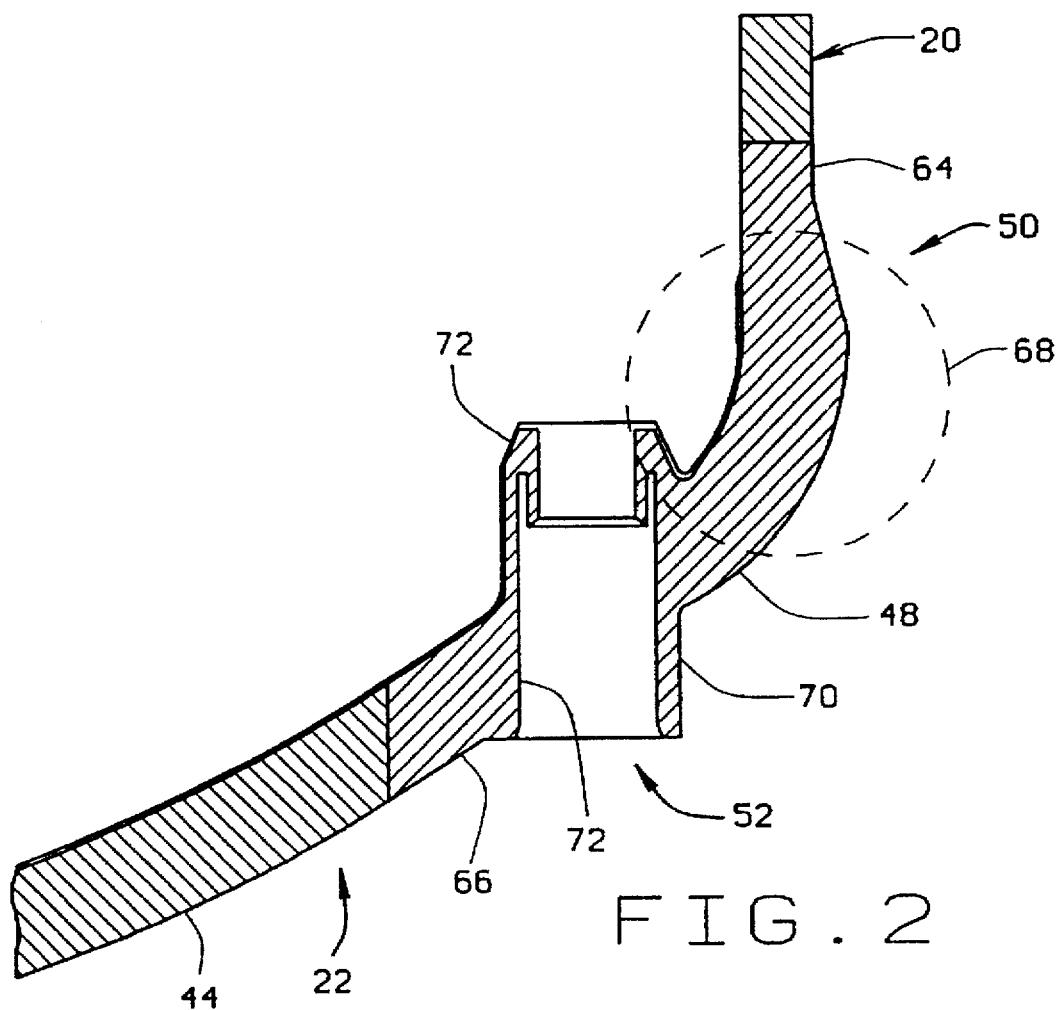
FIG. 2 is a cross-section view of a known bottom head knuckle annular forging.

Additional details regarding knuckle assembly 50 and specifically, annular forging 48, are shown in FIG. 2, which is a cross-section through a lower portion of fourth shell course 20, annular forging 48, and bottom head dome 44. More specifically, forging 48 includes a cylindrical top end 64 which is welded to fourth shell course 20. Forging 48 also includes a conical bottom end 66 which is welded to bottom head dome 44. A knuckle shaped region is indicated generally at 68, and such region 68 is the interface between cylindrical top end 64 and conical bottom end 66. Nozzle 52 includes an external projection 70, an internal projection 72 and an opening 72 through which pump 54 (FIG. 1) extends. Opening 72 is shaped to facilitate welding pumps 54 in position as described above. Surfaces of forging 48 defining nozzle opening 72 intersect at approximately a ninety degree angle and define external projection 70.

In forming nozzle projections 70 and 72 in forging 48, it can be seen that machining operations must be performed both within the internal radius of forging 48 and outside such radius. Requiring such machining processes is time consuming and expensive in that additional tooling and setup time are required.

Figure 3:
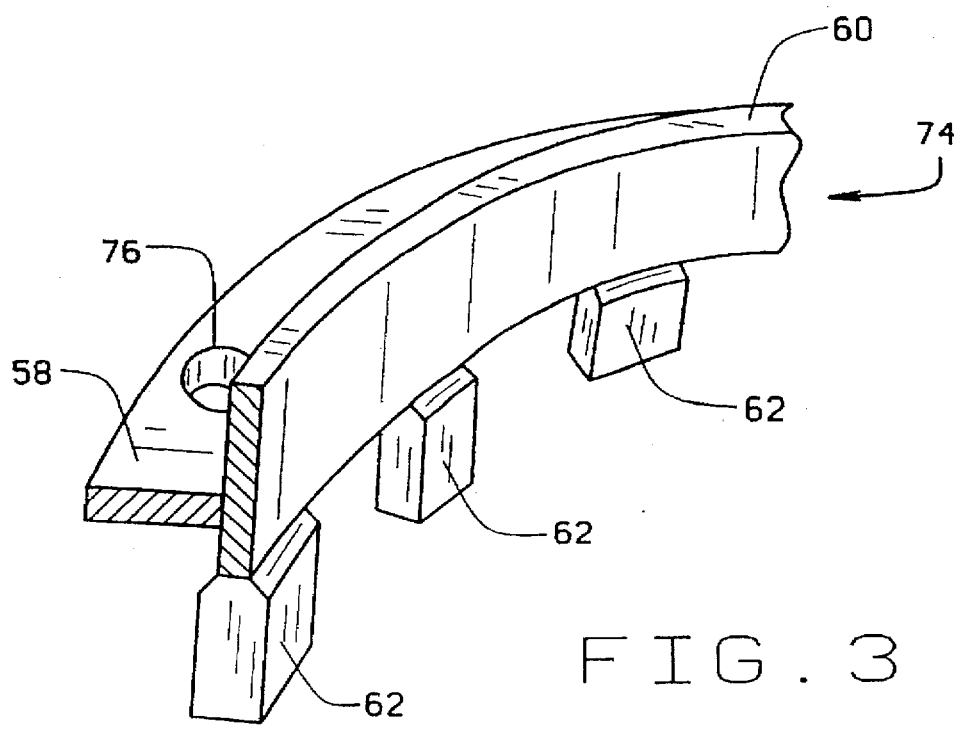
FIG. 3 is a perspective view of a section of a known shroud support subassembly.

FIG. 3 is a perspective view of a section of a known shroud support subassembly 74. Subassembly 74 includes shroud support cylinder 60 and a plurality of shroud support legs 62 (see also FIG. 1). Pump deck 58 extends from an outer surface of shroud support cylinder 60. A plurality of openings 76 are formed in pump deck 58.

Shroud support subassembly 74 is generally formed by separately fabricating, from Ni—Cr—Fe material, cylinder 60, legs 62 and pump deck 58. Such components are then welded together to form subassembly 74. Subassembly 74 is then welded to annular forging 48 (FIGS. 1 and 2) to complete formation of bottom head knuckle assembly 50.

The above described manufacture process for assembly 50 requires complex machining which increases the time and costs associated with RPV 10. Further, during scheduled reactor servicing, each weld in assembly 50 typically must be inspected to ensure that the weld integrity is being maintained. Of course, inspecting numerous welds is expensive and time consuming.

Figure 4:
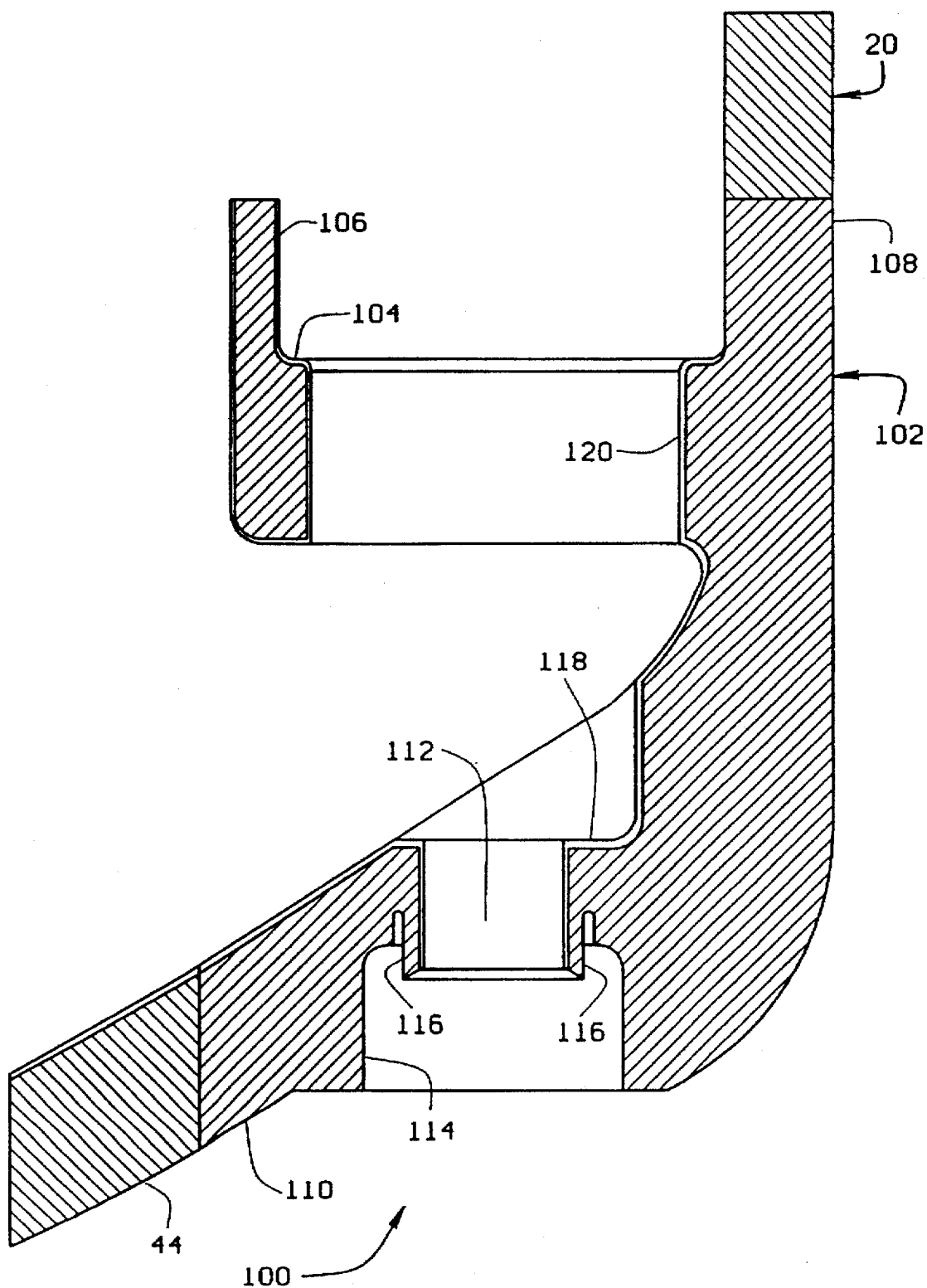
FIG. 4 is a cross section view of a bottom head knuckle assembly including an integral pump deck and shroud support in accordance with one embodiment of the present invention.

A bottom head knuckle assembly 100 with a reduced number of welds and reduced flow restrictions is illustrated in cross-section in FIG. 4. Particularly, annular forging 102 includes an integrally formed pump deck 104 and shroud support cylinder 106. When assembled into a reactor, shroud support cylinder 106 is welded or bolted to, i.e., secured to, and supports, the reactor core shroud (not shown). Annular forging 102 also includes a top, cylindrical shaped end 108 welded to fourth course 20 and a bottom, conical shaped end 110 welded to bottom head disk 44.

An RIP nozzle 112 also is integrally formed by forging 102. Nozzle 112 includes an opening 114 which includes stubs 116 for facilitating welding of a pump housing (not shown) to forging 102. Also, an upper portion 118 of opening 114 is configured to receive a portion of a diffuser (not shown) coupled to a pump shaft (not shown) which extends through opening 114. A diffuser opening 120 also is formed in pump deck 104. Opening 120 is sized so that a pump diffuser (not shown) can at least partially extend therethrough. The pump diffuser is connected to the pump shaft (not shown) which extends through opening 114.

With respect to forging 102, it is important to understand that external projection 70 (FIG. 2) for supporting a RIP pump is eliminated. Such external projection 70 is eliminated by providing that the forging surface adjacent nozzle opening 114 is substantially planar. With nozzle external projection 70 (FIG. 2), the forging surfaces adjacent nozzle opening 72 are not planar. Rather, such surfaces intersect at approximately a ninety degree angle and define external projection 70. In addition, internal projection 72 (FIG. 2) has been eliminated by lowering the diffuser interface to surface 118, as is shown in FIG. 4. By eliminating such internal projection 72 and external projection 70 in forging 102, manufacture of forging 102 is believed to be greatly simplified. By simplifying manufacture of forging 102, the amount of time and costs associated with making forging 102 are believed to be reduced.

It should be understood, of course, that FIG. 4 is a cross sectional view of forging 102. Forging 102 is annular and may have a diameter, for example, of about twenty feet. About ten (10) nozzles openings 114 and diffuser openings 120 are formed at spaced locations in annular forging 102.

Bottom head knuckle assembly 100 has a reduced number of welds as compared known knuckle assemblies. Particularly, by forming pump deck 104 and shroud support cylinder 106 integral with forging 102, many welds are eliminated. As a result, the amount of time required to inspect the welds associated with forging 102 should be reduced as compared to the amount of time required to inspect welds associated with known assemblies. Further, since pump deck 104 and shroud support 106 are integral with forging 102, pump deck 104 and support 106 are constructed of the same material as forging 102, e.g., low alloy carbon steel. Such construction therefore eliminates the use of Ni—Cr—Fe material for pump deck 104 and support 106.

In addition, by eliminating support legs 62 (FIG. 3), assembly 100 has reduced flow restrictions. By reducing the flow restrictions, flow of water into the bottom head region of the reactor should be improved.

Figure 5:
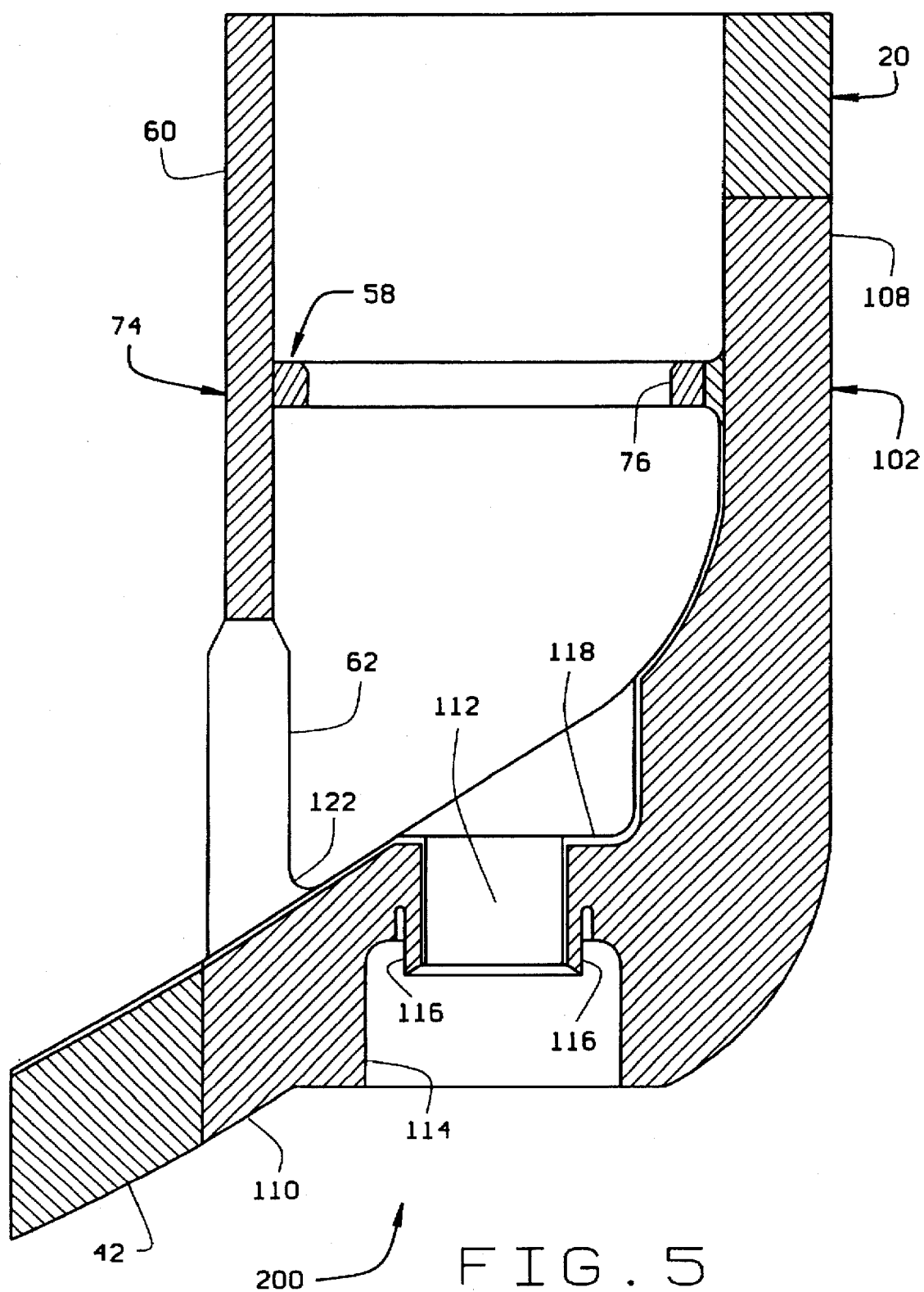
FIG. 5 is a cross section view of a bottom head knuckle assembly in accordance with another embodiment of the present invention.

FIG. 5 is a cross section view of a bottom head knuckle assembly 200 in accordance with another embodiment of the present invention. The same reference numerals used in previous drawings to refer to components shown therein are used to refer to the same components in forging 200. Assembly 200 is configured to be used with known shroud support subassembly 74 (see FIG. 2). Specifically, assembly 200 includes annular forging 102 having top, cylindrical shaped end 108 welded to fourth course 20 and bottom, conical shaped end 110 welded to bottom head disk 42. RIP nozzle 112 is integrally formed by forging 102. Nozzle 112 includes opening 114 which includes stubs 116 for facilitating welding of a pump housing (not shown) to forging 102. Also, upper portion 118 of opening 114 is configured to receive a portion of a diffuser (not shown) coupled to a pump shaft (not shown) which extends through opening 114.

Assembly 200 also includes shroud support subassembly 74. Subassembly 74 includes shroud support cylinder 60 and a plurality of shroud support legs 62 (see also FIG. 2). Pump deck 58 extends from an outer surface of shroud support cylinder 60. A plurality of openings 76 are formed in pump deck 58.

Shroud support subassembly 74 is formed by separately fabricating, from Ni—Cr—Fe material, cylinder 60, legs 62 and pump deck 58. Such components are then welded together to form subassembly 74. Subassembly 74 is then welded to weld build-up pads 122 and 124 formed on annular forging 102 to complete formation of bottom head knuckle assembly 200.

Although assembly 200 does not include all the advantages of an integral pump deck and shroud support as with assembly 100, assembly 200 still provides the important advantage of eliminating the internal and external projections. Eliminating such internal and external projections is believed to greatly simplify manufacture of forging 102, as explained above. Assembly 200 also provides the advantage of using known and proven shroud support subassembly 72.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A bottom head to shell junction assembly for being connected at a first end to a substantially cylindrical shell course of a nuclear reactor pressure vessel and at a second end to a bottom head dome of the reactor pressure vessel, said assembly comprising an annular forging, at least one nozzle opening formed through said annular forging, said forging surface adjacent said nozzle opening being substantially planar, and stubs extending into said nozzle opening, said stubs configured to facilitate welding a pump housing to said forging.

2. A bottom head to shell junction assembly in accordance with claim 1 wherein an upper portion of said nozzle opening is configured to receive a portion of a diffuser coupled to a pump shaft which extends through said nozzle opening.

3. A bottom head to shell junction assembly in accordance with claim 1 wherein said annular forging is a low alloy carbon steel.

4. A bottom head to shell junction assembly in accordance with claim 1 further comprising a pump deck and shroud support.

5. A bottom head to shell junction assembly in accordance with claim 4 wherein said pump deck and shroud support are integral with said annular forging.

6. A bottom head to shell junction assembly in accordance with claim 4 wherein said pump deck and shroud support are formed separately from said annular forging and are welded thereto.

7. A bottom head to shell junction assembly in accordance with claim 6 wherein further comprising shroud support legs welded to said shroud support, said annular forging further comprising weld build-up pads, each of said shroud support legs welded to one of said weld build-up pads.

8. A bottom head to shell junction assembly in accordance with claim 4 wherein said shroud support is configured to be secured to a reactor core shroud.

9. A bottom head to shell junction assembly in accordance with claim 4 wherein a diffuser opening is formed in said pump deck.

10. A bottom head to shell junction assembly for being connected at a first end to a substantially cylindrical shell course of a nuclear reactor pressure vessel and at a second end to a bottom head dome of the reactor pressure vessel, said assembly comprising an annular forging, at least one nozzle opening formed through said annular forging, said forging surface adjacent said nozzle opening being substantially planar, an upper portion of said nozzle opening configured to receive a portion of a diffuser coupled to a pump shaft which extends through said nozzle opening, said assembly further comprising a pump deck and shroud support integral with said annular forging.

11. A bottom head to shell junction assembly in accordance with claim 10 wherein stubs extend into said nozzle opening, said stubs configured to facilitate welding a pump housing to said forging.

12. A bottom head to shell junction assembly in accordance with claim 10 wherein said annular forging is a low alloy carbon steel.

13. A bottom head to shell junction assembly in accordance with claim 10 wherein said pump deck and shroud support are formed separately from said annular forging and are welded thereto.

14. A bottom head to shell junction assembly in accordance with claim 13 wherein further comprising shroud support legs welded to said shroud support, said annular forging further comprising weld build-up pads, each of said shroud support legs welded to one of said weld build-up pads.

15. A bottom head to shell junction assembly in accordance with claim 10 wherein said shroud support is configured to be secured to a reactor core shroud.

16. A bottom head to shell junction assembly in accordance with claim 10 wherein a diffuser opening is formed in said pump deck.

17. A bottom head to shell junction assembly for being connected at a first end to a substantially cylindrical shell course of a nuclear reactor pressure vessel and at a second end to a bottom head dome of the reactor pressure vessel, said assembly comprising an annular forging having an inner surface and an outer surface, at least one nozzle with an opening formed through said annular forging, said inner forging surface adjacent said nozzle opening being substantially planar, said nozzle not projecting into said vessel.

18. A bottom head to shell junction assembly in accordance with claim 17 further comprising a pump deck and shroud support integral with said annular forging.

* * * * *